United States Patent [19]

Swedelius

[11] 3,820,831

[45] June 28, 1974

[54] COUPLING FOR CONNECTING ALIGNED TUBES

[76] Inventor: Joseph B. Swedelius, 1867 Sheridan Ave., San Diego, Calif. 92103

[22] Filed: Feb. 20, 1973

[21] Appl. No.: 333,763

[52] U.S. Cl. .............................................. 285/367
[51] Int. Cl. ............................................ F16l 17/00
[58] Field of Search .......... 285/367, 365, 366, 331, 285/332, 110, 409, 410, 411, 416

[56] References Cited
UNITED STATES PATENTS

| | | | |
|---|---|---|---|
| 2,269,664 | 1/1942 | Hallerberg | 284/367 X |
| 2,653,836 | 9/1953 | Christophersen et al. | 285/366 X |
| 2,761,707 | 9/1956 | Herman | 285/367 |
| 2,992,840 | 7/1961 | Reynolds et al. | 285/367 X |
| 3,016,249 | 1/1962 | Contreras et al. | 285/367 X |
| 3,455,582 | 7/1969 | Van Hoevel | 285/367 X |

FOREIGN PATENTS OR APPLICATIONS

| | | | |
|---|---|---|---|
| 43,424 | 6/1938 | Netherlands | 285/367 |
| 686,387 | 1/1953 | Great Britain | 285/110 |

Primary Examiner—Alfred R. Guest
Attorney, Agent, or Firm—Brown and Martin

[57] ABSTRACT

The coupling comprises two rings, one of the rings having a groove and the other ring including a section having a portion that extends into the groove. A clamp is employed for effecting a wedging between the two rings to provide a seal therebetween.

4 Claims, 4 Drawing Figures

PATENTED JUN 28 1974 3,820,831

COUPLING FOR CONNECTING ALIGNED TUBES

BACKGROUND OF THE INVENTION

1. Field of the Invention

The invention is directed to couplings for drawing aligned coupling rings into sealing relationship with one another.

2. Description of the Prior Art

The prior art in general provides coupling in which parallel surfaces of two rings are drawn together in an attempt to seal those surfaces to one another. The prior art does not disclose a coupling in which one of the rings is provided with a concentric groove and the other is in the form of sheet material having a concentric flange which is forced into the groove to form a seal between the two rings.

SUMMARY OF THE INVENTION

The coupling includes two axially aligned rings, each having a section to which tubes are attached, and a clamp for forcing the rings toward one another. One of the rings is provided with a concentric groove, preferably in a side face thereof. The other ring is formed of sheet material having an angling section which extends into the groove. A clamp presses the angling section into the groove to form a seal between that section and the wall forming the groove.

Other features and the advantages of the present invention will be apparent from the following description, reference being had to the accompanying drawing wherein a preferred embodiment of the invention is illustrated.

DESCRIPTION OF THE PREFERRED EMBODIMENT

Figure 1:
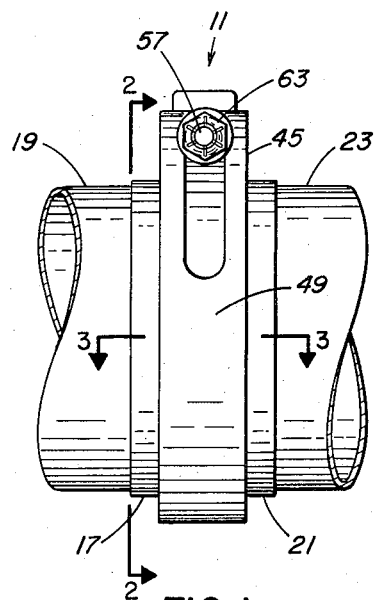
FIG. 1 is a side view of the coupling, together with fragments of the two tubes that are joined by the coupling.
Figure 2:
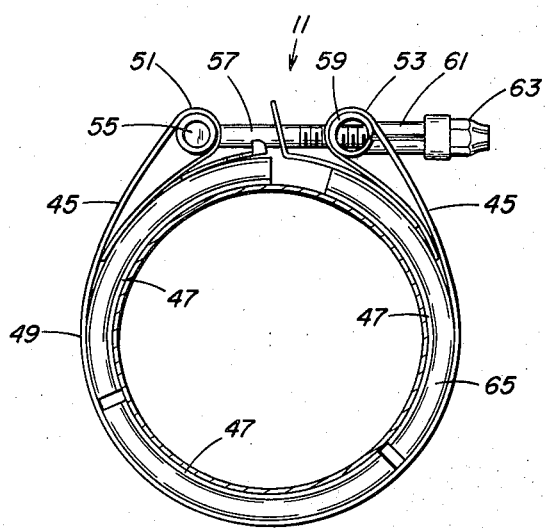
FIG. 2 is a view looking in the direction of arrows 2—2 of FIG. 1.
Figure 4:
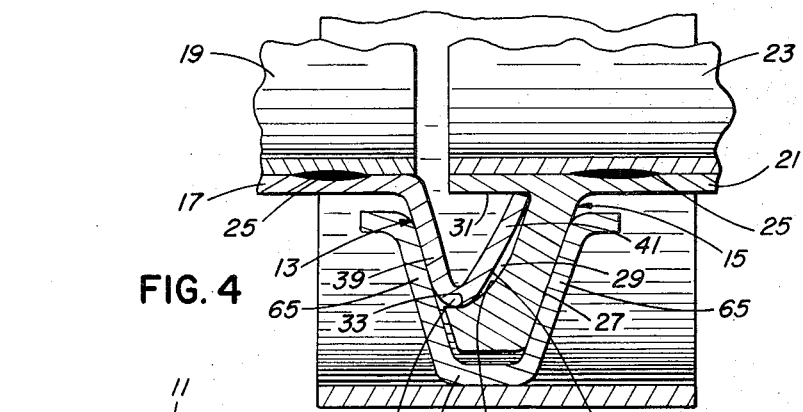
FIG. 4 is a fragmentary sectional view showing the sealing surfaces on a larger scale.
Figure 3:
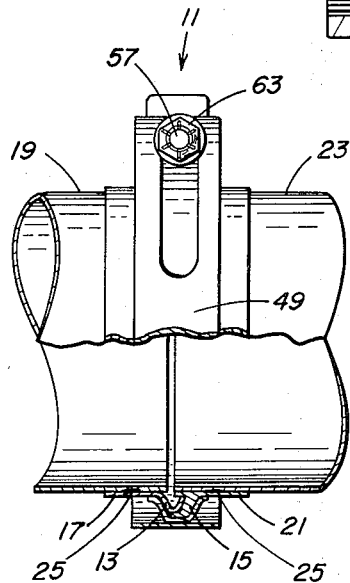
FIG. 3 is a side view, partly in section, the section being taken along line 3—3 of FIG. 1.

The coupling 11 includes axially aligned rings 13 and 15. Ring 13 includes an axially extended section 17 to which a tube 19 is attached; and ring 15 is provided with a like axial extension 21 to which a tube 23 is attached. The tubes are preferably welded to the extensions, the welds being indicated at 25.

The ring 15 includes a radial extension 27 that is provided with a concentric groove 29, which is herein shown for illustrative purpose as being disposed at the side face of the ring. This groove is formed by abutment walls, the inner upper wall being shown at 31, the outer lower wall at 33 and the vertical connecting wall at 35.

The ring 13 is formed of suitable sheet material, such as sheet metal. A section 37 thereof includes a radially and outwardly extending portion 39 that is inclined toward the inner end of the section. It also includes a radially inwardly extending portion 41 and a yoke 43 connecting those portions. In the embodiment illustrated for sealing the rings with one another, the inwardly extending portion 41 and the yoke 43 extend into the groove.

Any form of clamp can be employed for applying pressure to the portion 39 of the section 37 of ring 13. The clamp 45 herein shown includes three arcuate sections 47 that are welded to an arcuately shaped strip 49. The ends of the strip are in the form of loops 51 and 53. Loop 51 receives the crosshead 55 of a T-shaped bolt 57. The loop 53 receives the crosshead 59 of a hollow T-shaped element 61. The threaded shank of the bolt 57 extends through the element 61 and the end of the shank carries a nut 63. The sections 47 are provided with oppositely disposed, radially inwardly extending flanges 65 having contours that complement the outer surface of the radial extension 27 of ring 15 and the outwardly extending portion 39 of section 37 of ring 13. By manipulating the nut 63, the rings 13 and 15 are forced farther into one another to effect a wedging, i.e., a sealing engagement of the inner end of portion 41 with the groove 29 at the junction of walls 31 and 35 of the groove and wedging, i.e., sealing engagement of the yoke 43 with the groove 29 at the wall 33 thereof. The flanges 65 on the clamp can be spread radially sufficiently so that the diameter of the flanges is larger than the diameter of the radial extension 27 of ring 15. Thus the clamp can be readily applied and readily removed.

Thus it is apparent from the foregoing that by virtue of the present invention, I have provided an effective sealing coupling for tubes or pipes; the word "tube" is employed generically to include pipes. Too, the construction of the rings is such that one of the rings can be formed of sheet material, thus reducing the cost and weight of former constructions in which both rings had to be formed of relatively heavy and expensive material.

Having described my invention, I claim:

1. A coupling for connecting aligned tubes, said coupling comprising in combination:

A a ring having:
1. a circular section having walls forming a circular groove in a lateral end face thereof,
2. a circular section extending axially and longitudinally of the first mentioned section, said second mentioned section having a surface to which a tube can be attached;

B a second ring axially disposed with respect to the first mentioned ring, said second mentioned ring having:
1. a radially extending section including:
   a. a circular outwardly extending and inclined portion extending toward the inner end of the second mentioned ring,
   b. a circular inwardly extending portion extending toward the inner end of the second mentioned ring,
   c. a yoke connecting said portions, said latter portion and the yoke extending into the groove of the first mentioned ring, the radial length of the yoke and the radial extension of the second mentioned ring being such that when axial pressure is applied to the inclined portion, sealing relationship is established between the walls of the first mentioned ring and the yoke and the inner end of section of the second mentioned ring, 2. a circularly section extending axially outwardly fo the first mentioned section to which a tube can be attached;
C. means for applying pressure on the inclined portion of the second mentioned ring to effect sealing between the first mentioned ring and the yoke and the end of the section of the second mentioned ring.

2. A coupling as defined in claim 1, characterized in that the second mentioned ring is formed of sheet material.

3. A coupling as defined in claim 1, characterized in that the second mentioned ring is formed of sheet metal.

4. A coupling as defined in claim 1, characterized in that the circular groove is concentric with the ring.

* * * * *